US009708530B2

(12) United States Patent
Thevasahayam

(10) Patent No.: US 9,708,530 B2
(45) Date of Patent: Jul. 18, 2017

(54) ORGANIC PHOSPHORESCENT MATERIALS AND METHODS FOR THEIR PREPARATION AND USE

(71) Applicant: EMPIRE TECHNOLOGY DEVELOPMENT LLC, Wilmington, DE (US)

(72) Inventor: Arockiadoss Thevasahayam, Madurai (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 414 days.

(21) Appl. No.: 14/402,090

(22) PCT Filed: Oct. 28, 2013

(86) PCT No.: PCT/IB2013/059709
§ 371 (c)(1),
(2) Date: Nov. 18, 2014

(87) PCT Pub. No.: WO2014/072874
PCT Pub. Date: May 15, 2014

(65) Prior Publication Data
US 2015/0131292 A1 May 14, 2015

(30) Foreign Application Priority Data
Nov. 6, 2012 (IN) ............... 4641/CHE/2012

(51) Int. Cl.
C09K 11/06 (2006.01)
F21V 9/16 (2006.01)

(52) U.S. Cl.
CPC ............. C09K 11/06 (2013.01); F21V 9/16 (2013.01); C09K 2211/10 (2013.01)

(58) Field of Classification Search
CPC .................................. C09K 11/06; F21V 9/16
See application file for complete search history.

(56) References Cited

U.S. PATENT DOCUMENTS

| 3,164,719 A | 1/1965 | Bauer |
| 5,464,651 A | 11/1995 | Turk et al. |
| 5,618,467 A | 4/1997 | Turk et al. |
| 8,299,787 B2 | 10/2012 | Nakayama et al. |

(Continued)

FOREIGN PATENT DOCUMENTS

| CN | 101172954 A | 5/2008 |
| CN | 100483785 C | 4/2009 |

(Continued)

OTHER PUBLICATIONS

International Search Report and Written Opinion from International Application No. PCT/IB2013/059709 mailed Mar. 28, 2014.

(Continued)

Primary Examiner — Casey Bryant
(74) Attorney, Agent, or Firm — Xinova, LLC

(57) ABSTRACT

Methods of forming an organic phosphorescent material are provided. The methods include dissolving a cellulosic material in a solvent to form a cellulosic mixture and filtering the cellulosic mixture. The methods also include heating the cellulosic mixture to form an organic phosphorescent material that includes a plurality of aliphatic compounds.

20 Claims, 6 Drawing Sheets

(56) References Cited

U.S. PATENT DOCUMENTS

2013/0033174 A1    2/2013  Takaku
2013/0303777 A1   11/2013  Okamoto et al.

FOREIGN PATENT DOCUMENTS

| JP | 2010-56547 A | 3/2010 |
|---|---|---|
| WO | WO 2005/059951 | 6/2005 |
| WO | WO 2011/125756 | 10/2011 |
| WO | WO 2012/046715 | 4/2012 |

OTHER PUBLICATIONS

"Jewel-Toned Organic Phosphorescent Crystals: A New Class of Light-Emitting Material," ScienceDaily, Feb. 14, 2011, pp. 1-3.
"Metabolite Discovery and Measurement :: Software," Chenomx Inc., accessed at http://www.chenomx.com/software/software, accessed on Jun. 9, 2014, pp. 1-3.
Bolton, O., "Activating efficient phosphorescence from purely organic materials by crystal design," Nature Chemistry, vol. 3, Feb. 13, 2011, pp. 205-210.
Smet, P.F., et al., "Luminescence in Sulfides: A Rich History and a Bright Future," Materials, vol. 3, pp. 2834-2883 (2010).

ORGANIC PHOSPHORESCENT MATERIALS AND METHODS FOR THEIR PREPARATION AND USE

CROSS-REFERENCE TO RELATED APPLICATIONS

This application is a U.S. National phase entry under 35 U.S.C. §371 of International Application No. PCT/IB2013/059709 filed on Oct. 28, 2013, which claims the benefit of Indian Patent Application No. 4641/CHE/2012, filed on Nov. 6, 2012, the entire contents of each of which are incorporated herein by reference in their entirety.

BACKGROUND

A variety of luminescent phosphor materials are being explored to reduce the costs of lighting devices such as light emitting diodes (LEDs), organic light emitting diodes (OLEDs), and compact fluorescent lamps (CFLs). For example, inorganic materials based on zinc and calcium sulfides, and yttrium aluminum garnet (YAG) doped rare earth metal oxides including europium and dysprosium are being used for lighting devices. Moreover, certain metal-organic phosphorescent materials are being used for OLED applications. However, most of the existing materials have issues like low stability, degradation in presence of heat and low quantum efficiency. In addition, certain materials are substantially expensive due to limited availability of rare earth minerals such as europium and dysprosium.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming an organic phosphorescent material are provided. The methods include dissolving a cellulosic material in a solvent to form a cellulosic mixture and filtering the cellulosic mixture. The methods also include heating the cellulosic mixture to form an organic phosphorescent material that includes a plurality of aliphatic compounds.

In accordance with another aspect, methods of forming an organic phosphorescent material are provided. The methods include dissolving an organic donor-acceptor complex in a solvent to form an organic solution and mixing an activated carboxylated ligand with the organic solution to form a mixture. The methods can also include adding a photoactive amino acid to the mixture to form an organic phosphorescent material.

In accordance with another aspect, organic phosphorescent materials are provided. The organic phosphorescent materials can include an organic donor-acceptor complex, a photoactive amino acid, and an activated carboxylated ligand configured to bind the organic donor-acceptor complex and the photoactive amino acid.

In accordance with another aspect, organic phosphorescent materials are provided. The organic phosphorescent materials can include a multi-aliphatic polycrystalline complex formed of 4-hydroxy butyrate, glutamine and butanone.

In accordance with another aspect, methods for generating phosphorescence are provided. The methods include providing a polycrystalline organic phosphorescent material having a plurality of aliphatic compounds and exposing the multi-aliphatic polycrystalline organic phosphorescent material to visible or ultraviolet (UV) light to generate phosphorescence.

In accordance with another aspect, kits are provided. The kits can include a multi-aliphatic polycrystalline organic phosphorescent material having a plurality of aliphatic compounds and an illumination source configured to radiate the multi-aliphatic polycrystalline organic phosphorescent material with visible or ultraviolet (UV) light to generate phosphorescence.

DETAILED DESCRIPTION

Figure 1:
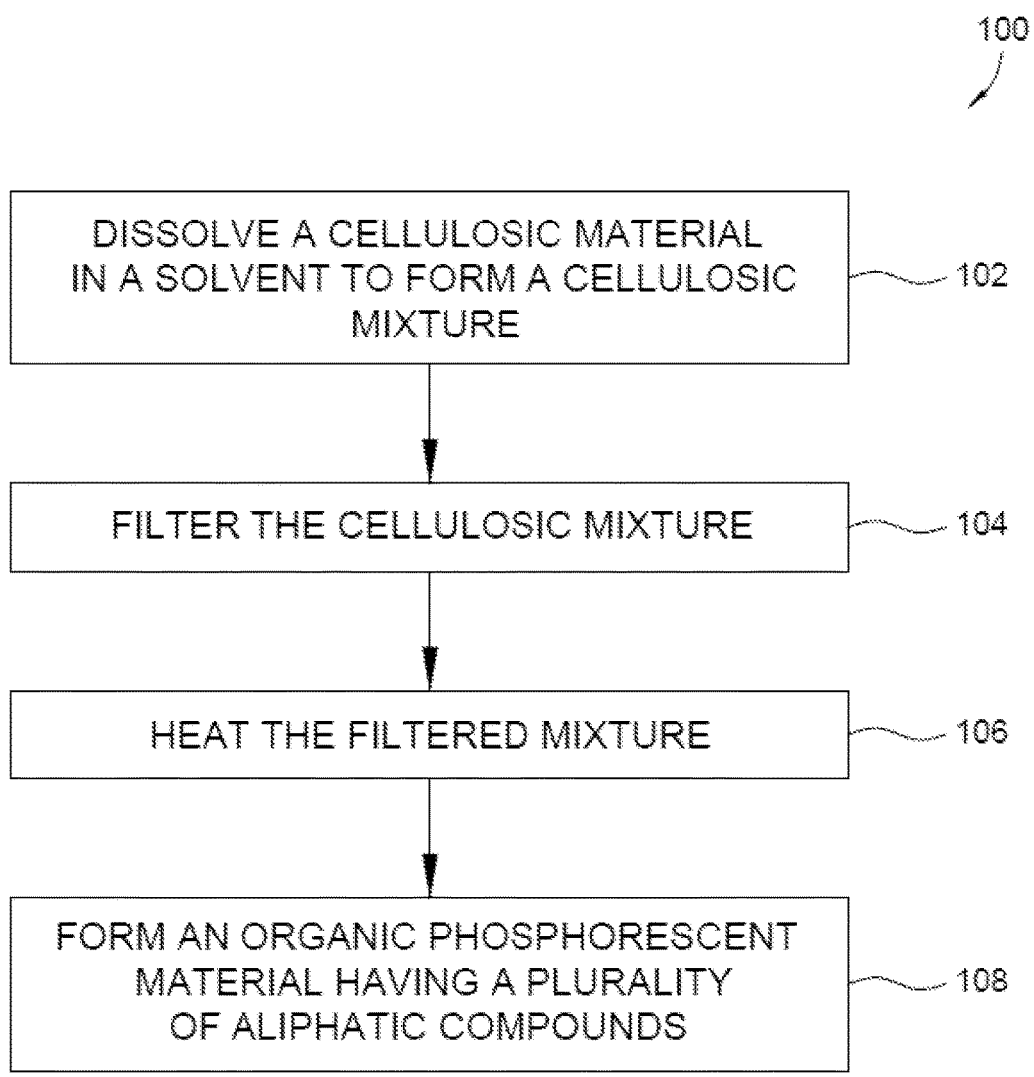
FIG. 1 is an example flow diagram of an embodiment of a method of forming an organic phosphorescent material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to a technique of forming organic phosphorescent materials. The present techniques provide luminous non-metallic organic phosphorescent materials that can be extracted from cellulosic materials using aerobic processes, or alternatively can be prepared synthetically from various starting materials. The disclosed phosphorescent materials are polycrystalline aliphatic organic materials having multiple aliphatic compounds that generate phosphorescence on exposure to visible or ultraviolet light. Such materials have substantially high quantum efficiency, are stable over a period of time, and are relatively inexpensive. The non-metallic organic phosphorescent materials disclosed herein may be used to improve upon current OLEDs and solid-state lighting devices.

Referring now to FIG. 1, an example flow diagram 100 of an embodiment of a method of forming an organic phosphorescent material is illustrated. At block 102, a cellulosic material is dissolved in a solvent to form a cellulosic mixture. The cellulosic material may include cotton, paper pulp, or combinations thereof. Moreover, the solvent may include acetone, ethanol, DMF, toluene, iso-propyl alcohol, acetic acid, ammonia, carbon tetrachloride ($CCl_4$), chloroform ($CHCl_3$), hydrochloric acid (HCl), sulfuric acid ($H_2SO_4$), or combinations thereof. The cellulosic mixture is then filtered (block 104).

At block 106, the filtered cellulosic mixture is heated to form the organic phosphorescent material having a plurality of aliphatic compounds (block 108). The heating can generally be to an elevated temperature, such as to a temperature of about 30° C. to about 75° C. Specific examples of elevated temperatures include about 30° C., about 35° C., about 40° C., about 45° C., about 50° C., about 55° C., about 60° C., about 65° C., about 70° C., about 75° C., and ranges between any two of these values. In certain example embodiments, the mixture can be heated under reduced pressure, such as in a vacuum chamber. In some embodiments, the mixture can be heated under reduced pressure in a vacuum chamber at a temperature of about 50° C. to about 60° C.

In this example embodiment, the plurality of aliphatic compounds include at least one organic donor-acceptor complex, at least one activated carboxylated ligand, and at least one photoactive amino acid. Examples of the organic donor-acceptor complex include, but are not limited to, 4-hydroxy butyrate, porphyrin, phthalocyanine, fullerene derivatives, donor-acceptor dyads, porphyrin-fullerene dyads, or combinations thereof. Examples of the activated carboxylated ligand complex include, but are not limited to, propan-2-ol, 2-chlorobutane, 1-chlorobutane, 3-methylhexane, butanone, 2-methylbutanoic acid, butan-2-ol, 1-chloro-3-methylpentane, or combinations thereof. Examples of the photoactive amino acid include, but are not limited to, glutamine, p-benzoylphenylalanine, aspartate (1 and 2), serine, tyrosine, cysteine, nitrophenylglycine (Npg, 6), β-aminoalanine, or combinations thereof. In one embodiment, the plurality of aliphatic compounds include 4-hydroxybutyrate, propan-2-ol, and glutamine. In one specific embodiment, the plurality of aliphatic compounds consist essentially of, or consist of 4-hydroxybutyrate, propan-2-ol, and glutamine.

The plurality of aliphatic compounds described above generate phosphorescence upon exposure to visible or ultraviolet light. Any suitable illumination source may be used to radiate the organic phosphorescent material with visible or ultraviolet light to generate phosphorescence.

Figure 2:
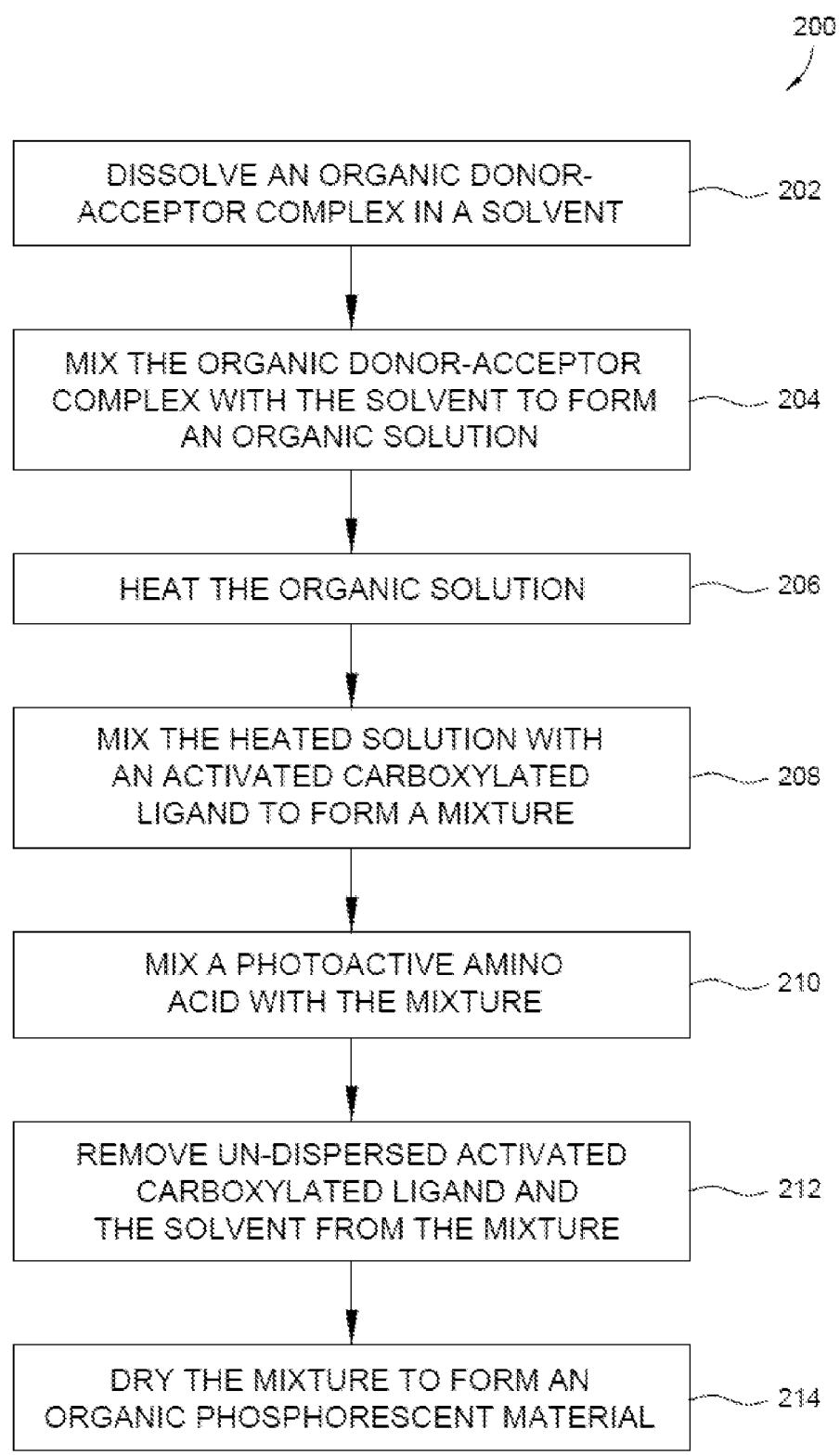
FIG. 2 is an example flow diagram of another embodiment of the method of forming an organic phosphorescent material.

FIG. 2 is an example flow diagram 200 of another alternative embodiment of the method of forming an organic phosphorescent material. At block 202, an organic donor-acceptor complex is dissolved in a solvent. Examples of the organic donor-acceptor complex include, but are not limited to, 4-hydroxy butyrate, porphyrin, phthalocyanine, fullerene derivatives, donor-acceptor dyads, porphyrin-fullerene dyads, or combinations thereof. In one example embodiment, the solvent is chloroform. The organic donor-acceptor complex is mixed with the solvent to form an organic solution (block 204). In one example embodiment, vortex-mixing is used to mix the organic donor-acceptor complex and the solvent.

At block 206, the organic solution is heated and the heated solution is mixed with an activated carboxylated ligand to form a mixture (block 208). Examples of the activated carboxylated ligand complex include, but are not limited to, propan-2-ol, 2-chlorobutane, 1-chlorobutane, 3-methylhexane, butanone, 2-methylbutanoic acid, butan-2-ol, 1-chloro-3-methylpentane, or combinations thereof. In one example embodiment, the activated carboxylated ligand includes or is butanone. In one embodiment, the organic solution is heated to an elevated temperature, such as to a temperature of about 30° C. to about 75° C. while vortex-mixing the activated carboxylated ligand with the organic solution. Specific examples of elevated temperatures include about 30° C., about 35° C., about 40° C., about 45° C., about 50° C., about 55° C., about 60° C., about 65° C., about 70° C., about 75° C., and ranges between any two of these values.

At block 210, a photoactive amino acid is mixed with the mixture. Examples of the photoactive amino acid include, but are not limited to, glutamine, p-benzoylphenylalanine, aspartate (1 and 2), serine, tyrosine, cysteine, nitrophenylglycine (Npg, 6), β-aminoalanine, or combinations thereof. In one specific embodiment, the photoactive amino acid includes or is glutamine. The organic donor-acceptor complex, the activated carboxylated ligand and the photoactive amino acid may be obtained from known chemical companies such as Allorachem SRL of Italy, Alfa Chemistry of U.S.A. and Bio-Rad of U.S.A. Moreover, un-dispersed activated carboxylated ligand and the solvent are removed from the mixture (block 212). Subsequently, the mixture is dried to form the organic phosphorescent material (block 214). In some embodiments, the mixture can be dried in an inert atmosphere, such as nitrogen ($N_2$), helium (He), argon (Ar), or combinations thereof. In general, the mixture can be dried for any length of time such as about 50 minutes to about 75 minutes. Specific examples of the length of time include about 50 minutes, about 55 minutes, about 60 minutes, about 65 minutes, about 70 minutes, about 75 minutes, and ranges between any two of these values. In one example embodiment, the organic phosphorescent material includes a multi-aliphatic polycrystalline complex formed of 4-hydroxy butyrate, glutamine and butanone.

FIGS. 3-6 illustrate different stages of formation of a multi-aliphatic polycrystalline complex formed of 4-hydroxy butyrate, glutamine and butanone using the process of FIG. 1.

Figure 3:
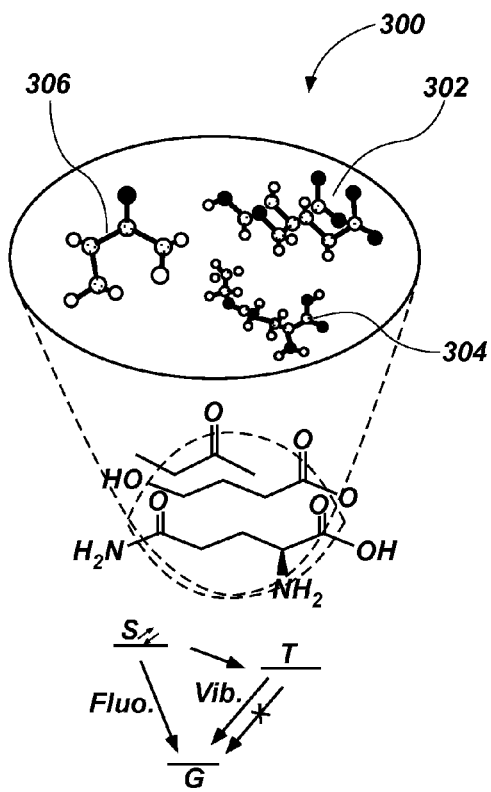
FIG. 3 illustrates individual aliphatic compounds of the multi-aliphatic polycrystalline complex.

FIG. 3 illustrates individual aliphatic compounds 300 of the multi-aliphatic polycrystalline complex. In this example embodiment, the aliphatic compounds include 4-hydroxy butyrate 302, glutamine 304 and butanone 306 dissolved in a solution such as ammonia. Without wishing to be bound by theory, it should be noted that these aliphatic compounds 302, 304 and 306 exhibit a degree of spin-orbit coupling at the carbonyl oxygen that allows for intrinsic triplet generation through intersystem crossing as will be described below.

As can be seen in this form, there is little or no bonding between the aliphatic compounds 302, 304 and 306. As a result, triplets are generated leading to fluorescence but the generation is not enough to prevent fluorescent singlet decay. Moreover, vibrational loss of triplets is substantially high making triplet emission inefficient and no phosphorescence is generated.

Figure 4:
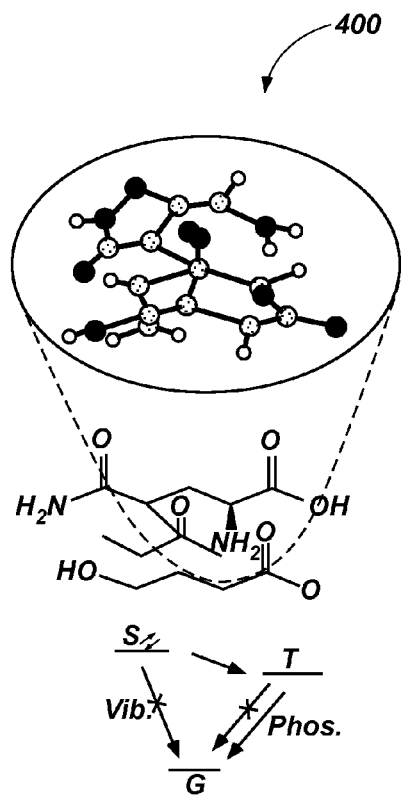
FIG. 4 illustrates a polycrystalline state of the multi-aliphatic polycrystalline complex.

FIG. 4 illustrates a polycrystalline state 400 of the multi-aliphatic polycrystalline complex. Here, butanone 306 acts as a bonding material configured to bind 4-hydroxy butyrate 302 and glutamine 304. Such bonding between these chromophores delocalizes the electrons of the carbonyl oxygen. As a result, triplet generation is promoted that suppresses the fluorescence and phosphorescence is activated by enhanced spin-orbit coupling to the ground state and reduced freedom of the aldehyde.

Figure 5:
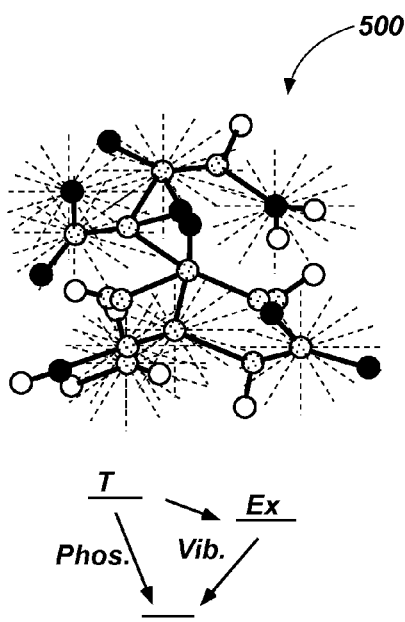
FIG. 5 illustrates chromophores in a highly ordered polycrystalline structure of the multi-aliphatic complex.

FIG. 5 illustrates chromophores 500 in a highly ordered polycrystalline structure. In this structure, the glutamine 304 suppresses fluorescence and generates phosphorescence. In particular, glutamine 304 promotes singlet to triplet conversion by enhancing spin-orbit coupling between excited state electrons of 4-hydroxy butyrate 302 and nucleus of the glutamine 304. In this state, proximity to the glutamine substantially promotes mixing of the singlet and triplet states of the excited chromophores to facilitate both singlet-to-triplet and triplet-to-singlet intersystem crossing. Moreover, excimer formation is observed and the self-quenching limits the quantum yield of the structure.

Figure 6:
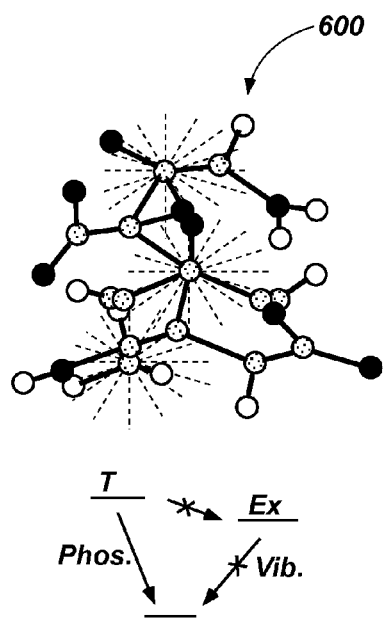
FIG. 6 illustrates an example highly ordered polycrystalline structure of the multi-aliphatic polycrystalline complex with the glutamine functioning as a host to activate phosphorescence.

FIG. 6 illustrates an example highly ordered polycrystalline structure 600 of the multi-aliphatic polycrystalline complex with the glutamine functioning as a host to activate phosphorescence. As discussed, the binding material butanone 306 binds the 4-hydroxy butyrate 302 and glutamine 304. Chromophores designed to have both aldehyde and amine groups exhibit a substantially strong bonding in their crystalline state. Therefore, this bonding attaches the amine to the aldehyde oxygen of neighboring molecules in a non-covalent interaction that substantially delocalizes the π-π electrons. Moreover, glutamine 304 acts at each site of triplet generation thereby increasing triplet generation and activating triplet emission to generate phosphorescence. In this structure, the chromophores are isolated thereby preventing excimer induced self-quenching. As a result, the quantum yield of the multi-aliphatic polycrystalline complex is substantially high. In certain embodiments, a quantum efficiency of the multi-aliphatic polycrystalline complex is about 0.35 to about 0.85.

EXAMPLES

The present invention will be described below in further detail with examples and comparative examples thereof, but it is noted that the present invention is by no means intended to be limited to these examples.

Example 1: Synthesis of an Organic Phosphorescent Material Formed From Paper Pulp The organic phosphorescent material was formed from fine paper pulp using the example method of FIG. 1. Here, about 10 grams of paper pulp was mixed with about diluted 5 milliliters of ammonia solution and the mixture was stirred for about 1 hour in aerobic atmosphere. Here, the mixture was stirred in presence of atmospheric air and was subsequently filtered. The filtrate was heated to a temperature of about 50° C. in a vacuum chamber. The residue obtained contained organic phosphorescent material that was characterized by Carbon-13 nuclear magnetic resonance (13C NMR) and proton nuclear magnetic resonance (1H NMR) using a Brucker 500 MHz-FT-NMR AVIII instrument.

Example 2: Characterization of the Organic Phosphorescent Material of Example 1

Figure 7:
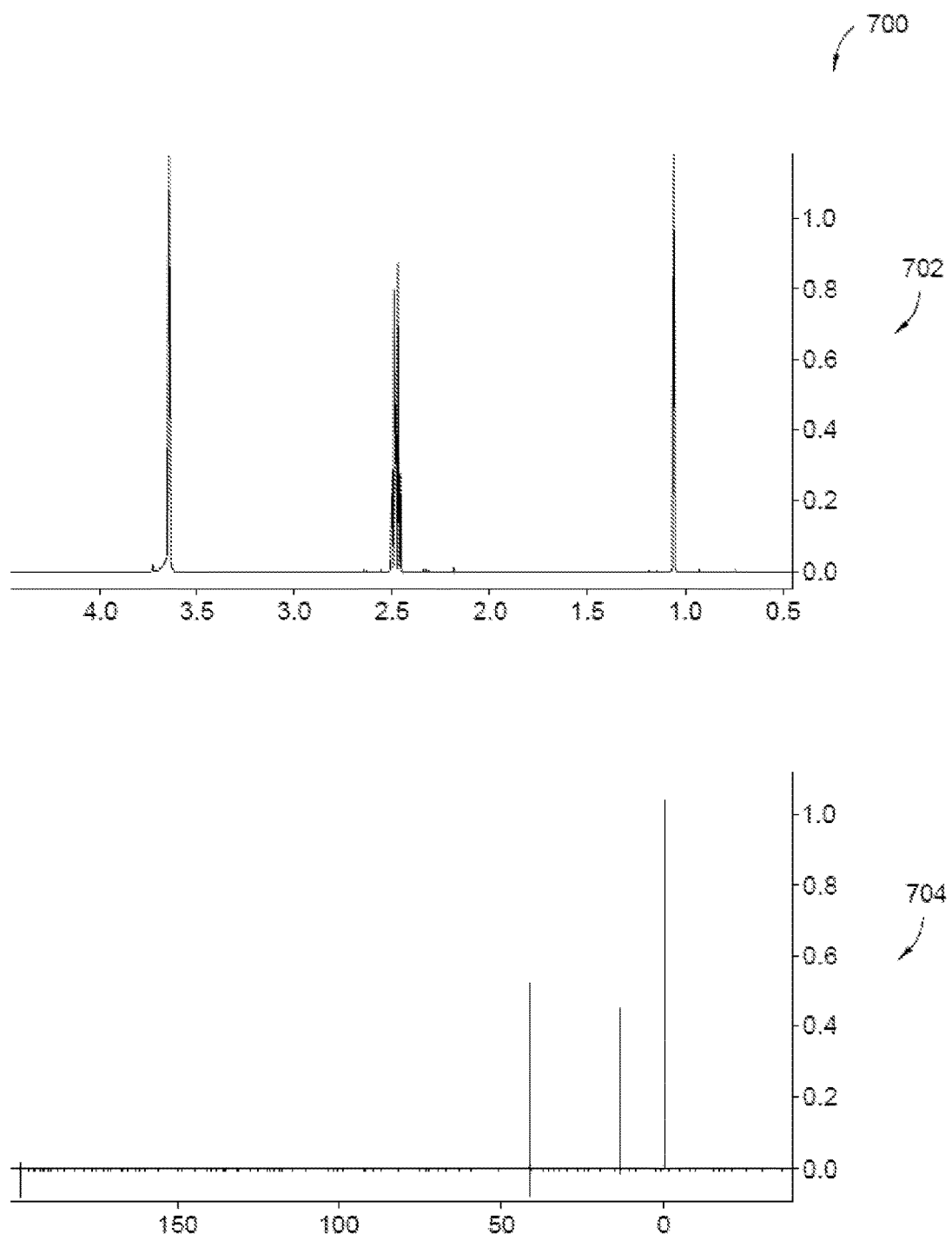
FIG. 7 illustrates example NMR spectra of the organic phosphorescent material.

FIG. 7 illustrates example NMR spectra 700 of the organic phosphorescent material. The 1H NMR spectrum is represented by reference numeral 702 and the 13C NMR spectrum is represented by reference numeral 704. The NMR software suite from Chenomx Inc. (Edmonton, Alberta, Canada) was used to analyze the NMR spectra 700. The compounds in the organic phosphorescent material observed from the NMR spectra 700 included butanone, 4-hydroxy butyrate and glutamine.

Figure 8:
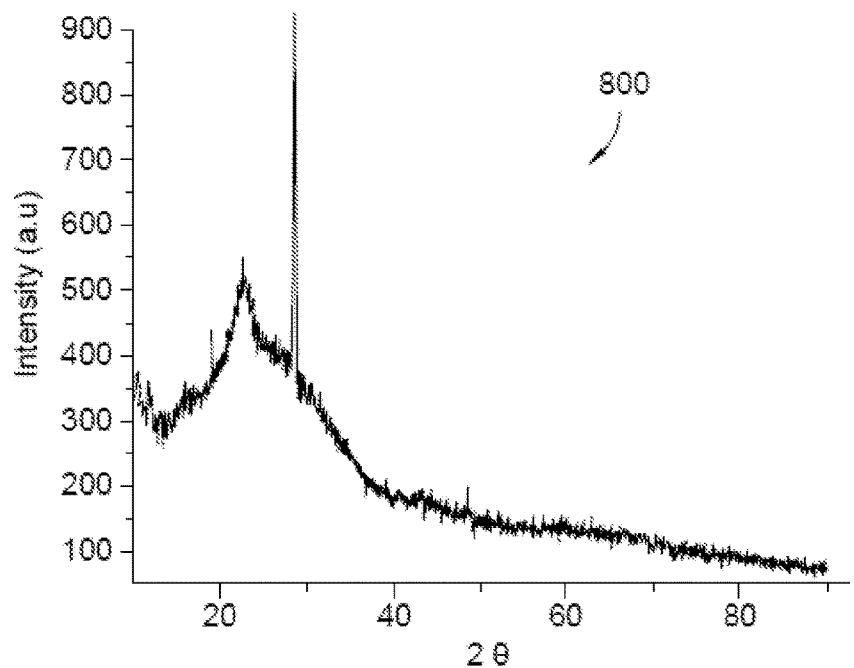
FIG. 8 illustrates example X-ray diffraction XRD pattern of the organic phosphorescent material formed using the process of FIG. 1.

FIG. 8 illustrates example X-ray diffraction XRD pattern 800 of the organic phosphorescent material formed using the process of FIG. 1. As illustrated, the XRD pattern 800 indicated that the three aliphatic compounds butanone, 4-hydroxy butyrate and glutamine formed a strong bond to exhibit polycrystallinity. In this polycrystalline form, the material generated phosphorescence on exposure to visible or ultraviolet light. The aliphatic compounds formed substantially strong bond with each other and such arrangement suppressed vibration and heat losses resulting in high quantum efficiency.

Example 3: Phosphorescence Produced by the Organic Phosphorescent Material

Figure 9:
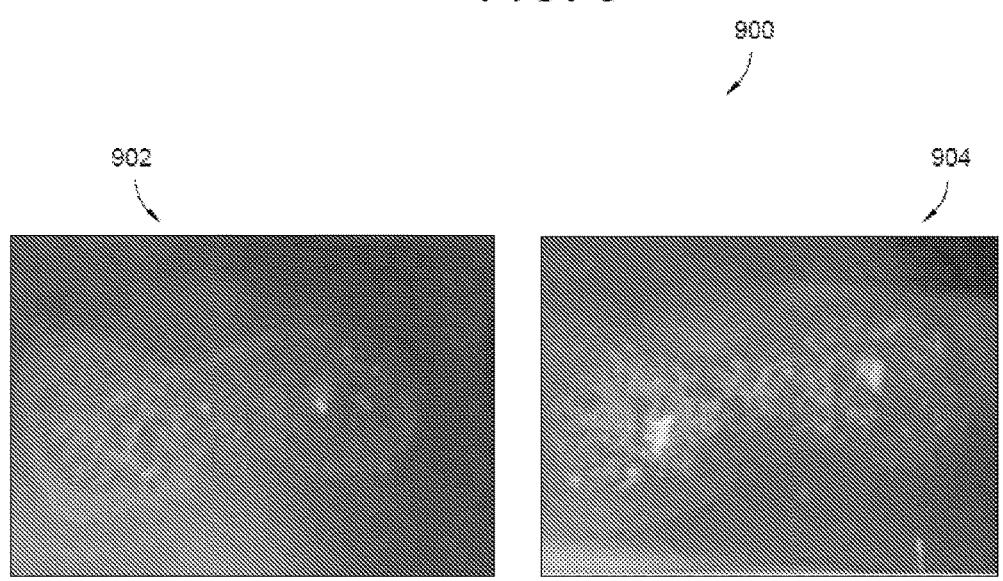
FIG. 9 shows example images illustrating phosphorescence generated from the organic phosphorescent material.

FIG. 9 shows example images 900 illustrating phosphorescence generated from the organic phosphorescent material. The polycrystalline organic phosphorescent material was exposed to ambient light and ultraviolet (UV) light having a wavelength of about 365 nanometers (nm). The images of the organic phosphorescent material upon exposure to the ambient light and the UV light are represented by reference numerals 902 and 904 respectively. The images 902 and 904 clearly illustrated the phosphorescence generated from the organic phosphorescent material.

Figure 10:
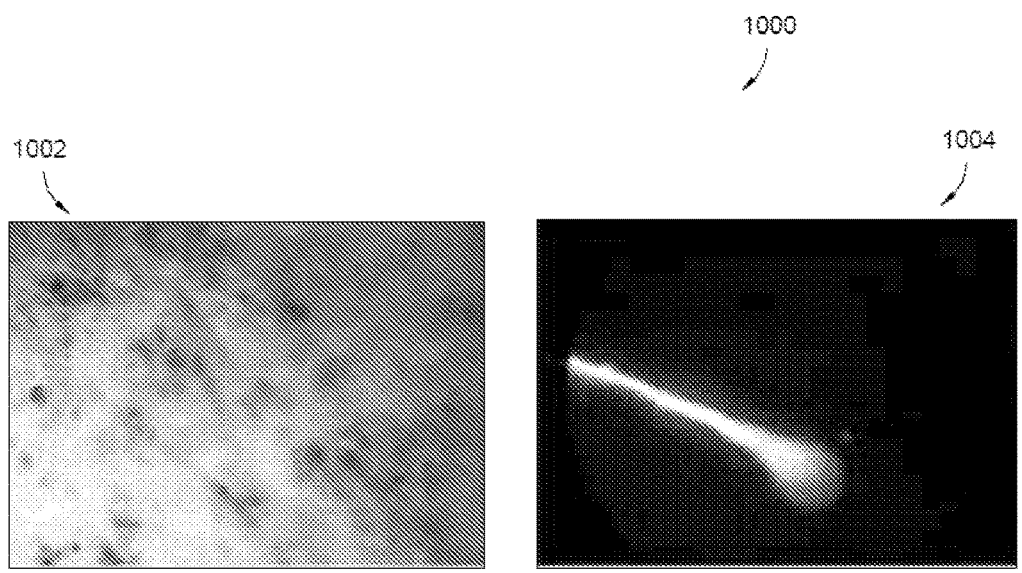
FIG. 10 shows example images illustrating phosphorescence generated from the organic phosphorescent material.

FIG. 10 shows example images 1000 illustrating phosphorescence generated from the organic phosphorescent material. The polycrystalline organic phosphorescent material was exposed to UV light having a wavelength of about 388 nanometers (nm). The organic phosphorescent material upon exposure to the UV light was observed using phase contrast microscope (Zeiss AX4 from Carl Zeiss). Here, the images of bulk organic phosphorescent material and an individual fiber of the material are represented by reference numerals 1002 and 1004 respectively. The images 1002 and 1004 clearly illustrated the phosphorescence generated from the organic phosphorescent material.

Figure 11:
FIG. 11 is an example image illustrating phosphorescence generated from the organic phosphorescent material coated on a flat glass surface.

FIG. 11 is an example image 1100 illustrating phosphorescence generated from the organic phosphorescent material coated on a flat glass surface. Here, bulk polycrystalline organic phosphorescent material was mixed with aqueous ammonia solution and spin coated on a flat glass surface. The surface of the glass was cleaned using sonication. The glass coated with the polycrystalline organic phosphorescent material was exposed to UV light having a wavelength of about 365 nanometers (nm). Again, the image 1100 clearly illustrated the phosphorescence generated from the organic phosphorescent material. Further, the material was substantially stable and did not show any degradation after exposure to the UV light for about 200 hours.

Example 4: Synthesis of an Organic Phosphorescent Material from Purified Starting Materials The organic phosphorescent material was formed using purified butanone, 4-hydroxy butyrate and glutamine obtained from Sigma Aldrich using the example method of FIG. 2. Here, about 1 milligrams (mg) (for example, about 0.9 nmole) of 4-hydroxy butyrate was mixed with about 3 milliliters (ml) of chloroform diluted with about 2 ml of water to form an organic solution. The solution was heated to a temperature of about 50° C. and about 500 microliters of butanone was added to the solution to form a mixture. Moreover, about 3 mg (for example, about 2 nmole) of glutamine was added to the mixture. Subsequently, un-dispersed activated carboxylated ligand and the solvent were removed from the mixture and the mixture was dried in presence of nitrogen ($N_2$), for about 3 minutes to form the organic phosphorescent material.

Example 5: Synthesis of an Organic Phosphorescent Material from Purified Starting Materials The organic phosphorescent material was formed using purified 3-methylhexane, phthalocyanine and p-benzoylphenylalanine obtained from Sigma Aldrich. Here, the molar ratio of the 3-methylhexane, phthalocyanine and p-benzoylphenylalanine was about 1:1.5:2. Here, about 1 mg (for example, about 0.9 nmole) of phthalocyanine was mixed with about 5 milliliters (ml) of dimethyl sulfoxide (DMSO) diluted with about 2 ml of water to form an organic solution. The solution was heated to a temperature of about 100° C. and about 500 microliters of 3-methylhexane was added to the solution to form a mixture. Moreover, about 3 mg (for example, about 2 nmole) of p-benzoylphenylalanine was added to the mixture. Subsequently, the mixture was dried in presence of nitrogen ($N_2$), for about 3 minutes to form the organic phosphorescent material.

Example 6: Synthesis of an Organic Phosphorescent Material from Purified Starting Materials The organic phosphorescent material was formed using purified 2-methylbutanoic acid, porphyrin and tyrosine obtained from Sigma Aldrich. Here, the molar ratio of the 2-methylbutanoic acid, porphyrin and tyrosine was about 1:1.5:2. Here, about 1 mg (for example, about 0.9 nmole) of porphyrin was mixed with about 3 milliliters (ml) of chloroform diluted with about 2 ml of water to form an organic solution. The solution was heated to a temperature of about 100° C. and about 500 microliters of 2-methylbutanoic acid was added to the solution to form a mixture. Moreover, about 3 mg (for example, about 2 nmole) of tyrosine was added to the mixture. Subsequently, the mixture was dried in presence of nitrogen ($N_2$), for about 3 minutes to form the organic phosphorescent material.

Example 7: Synthesis of an Organic Phosphorescent Material from Purified Starting Materials The organic phosphorescent material was formed using purified 1-chloro-3-methylpentane, fullerene derivatives and cysteine obtained from Sigma Aldrich. Here, about 1 mg (for example, about 0.9 nmole) of fullerene derivatives was mixed with about 3 milliliters (ml) of acetone and about 3 ml of chloroform diluted with about 2 ml of water to form an organic solution. The solution was heated to a temperature of about 100° C. and about 500 microliters of 1-chloro-3-methylpentane was added to the solution to form a mixture. Moreover, about 3 mg (for example, about 2 nmole) of cysteine was added to the mixture. Subsequently, un-dispersed solvent were removed from the mixture and the mixture was dried in presence of nitrogen ($N_2$), for about 3 minutes to form the organic phosphorescent material.

Example 8: Synthesis of an Organic Phosphorescent Material from Purified Starting Materials The organic phosphorescent material was formed using purified 2-chlorobutane, porphyrin-fullerene dyads and tyrosine obtained from Sigma Aldrich. Here, about 1 mg (for example, about 0.9 nmole) of porphyrin-fullerene dyads was mixed with about 3 milliliters (ml) of chloroform diluted with about 2 ml of water to form an organic solution. The solution was heated to a temperature of about 100° C. and about 500 microliters of 2-chlorobutane was added to the solution to form a mixture. Moreover, about 3 mg (for example, about 2 nmole) of tyrosine was added to the mixture. Subsequently, un-dispersed solvent was removed from the mixture and the mixture was dried in presence of nitrogen ($N_2$), for about 3 minutes to form the organic phosphorescent material.

Example 9: A Kit to Generate Phosphorescence

A kit for generating phosphorescence was formed using the organic phosphorescent material of examples 1 and 4. The kit included the multi-aliphatic polycrystalline organic phosphorescent material having 4-hydroxy butyrate, glutamine and butanone and an illumination source to radiate the multi-aliphatic polycrystalline organic phosphorescent material with UV light to generate phosphorescence. Here, the illumination source included a UV light source to radiate UV light having a wavelength of about 350 nanometers to about 380 nanometers. As the organic phosphorescent material was exposed to the UV light, the triplet generation was enhanced and triplet emission of the aliphatic compounds was activated and phosphorescence was generated.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation no, such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, and so on" is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). In those instances where a convention analogous to "at least one of A, B, or C, and so on." is used, in general, such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and so on).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of forming an organic phosphorescent material, the method comprising:
dissolving a cellulosic material in a solvent to form a cellulosic mixture;
filtering the cellulosic mixture; and
heating the cellulosic mixture to form the organic phosphorescent material, wherein the organic phosphorescent material comprises a plurality of aliphatic compounds.

2. The method of claim 1, wherein dissolving the cellulosic material in the solvent to form the cellulosic mixture comprises dissolving cotton, paper pulp, or combinations thereof in the solvent.

3. The method of claim 1, wherein heating the cellulosic mixture to form the organic phosphorescent material includes heating the cellulosic mixture to form the plurality of aliphatic compounds that comprise an organic donor-acceptor complex, an activated carboxylated ligand, and a photoactive amino acid.

4. The method of claim 3, wherein heating the cellulosic mixture to form the plurality of aliphatic compounds that comprise the organic donor-acceptor complex, the activated carboxylated ligand, and the photoactive amino acid includes: heating the cellulosic mixture to form the organic donor-acceptor complex that comprises 4-hydroxy butyrate, porphyrin, phthalocyanine, fullerene derivatives, donor-acceptor dyads, porphyrin-fullerene dyads, or combinations thereof.

5. The method of claim 3, wherein heating the cellulosic mixture to form the plurality of aliphatic compounds that comprise the organic donor-acceptor complex, the activated carboxylated ligand, and the photoactive amino acid includes: heating the cellulosic mixture to form the activated carboxylated ligand that comprises propan-2-ol, 2-chlorobutane, 1-chlorobutane, 3-methylhexane, butanone, 2-methylbutanoic acid, butan-2-ol, 1-chloro-3-methylpentane, or combinations thereof.

6. The method of claim 3, wherein heating the cellulosic mixture to form the plurality of aliphatic compounds that comprise the organic donor-acceptor complex, the activated carboxylated ligand, and the photoactive amino acid includes: heating the cellulosic mixture to form the photoactive amino acid that comprises glutamine, p-benzoylphenylalanine, aspartate (1 and 2), serine, tyrosine, cysteine, nitrophenylglycine (Npg, 6), β-aminoalanine, or combinations thereof.

7. The method of claim 1, wherein dissolving the cellulosic material in the solvent to form the cellulosic mixture includes dissolving the cellulosic mixture in the solvent that comprises acetone, ethanol, DMF, toluene, iso-propyl alcohol, acetic acid, ammonia, carbon tetrachloride ($CCl_4$), chloroform ($CHCl_3$), hydrochloric acid (HCl), sulfuric acid ($H_2SO_4$), or combinations thereof.

8. The method of claim 1, wherein heating the cellulosic mixture comprises heating the mixture in a vacuum chamber at a temperature of about 50° C. to about 60° C.

9. A method comprising:
dissolving an organic donor-acceptor complex in a solvent to form an organic solution;
mixing an activated carboxylated ligand with the organic solution to form a mixture; and
mixing a photoactive amino acid to the mixture to form an organic phosphorescent material.

10. The method of claim 9, wherein dissolving the organic donor-acceptor complex in the solvent to form the organic solution includes dissolving, in the solvent, the organic donor-acceptor complex that comprises 4-hydroxy butyrate, porphyrin, phthalocyanine, fullerene derivatives, donor-acceptor dyad, porphyrin-fullerene dyad, or combinations thereof.

11. The method of claim 9, wherein mixing the activated carboxylated ligand with the organic solution to form the mixture includes mixing the activated carboxylated ligand that comprises propan-2-ol, 2-chlorobutane, 1-chlorobutane, 3-methylhexane, butanone, 2-methylybutanoic acid, butan-2-ol, 1-chloro-3-methylpentane, or combinations thereof with the organic solution.

12. The method of claim 9, wherein mixing the photoactive amino acid to the mixture to form the organic phosphorescent material includes mixing the photoactive amino acid that comprises glutamine, p-benzoylphenylalanine, aspartate (1 and 2), serine, tyrosine, cysteine, nitrophenylglycine (Npg, 6), β-aminoalanine, or combinations thereof to the mixture.

13. The method of claim 9, wherein mixing the photoactive amino acid to the mixture to form the organic phosphorescent material includes mixing the photoactive amino acid to the mixture to form the organic phosphorescent material that comprises a multi-aliphatic polycrystalline complex formed of 4-hydroxy butyrate, glutamine, and butanone.

14. The method of claim 9, wherein mixing the activated carboxylated ligand comprises vortex-mixing the activated carboxylated ligand with the organic solution at a temperature of about 35° C. to about 50° C.

15. The method of claim 9, further comprising:
removing un-dispersed activated carboxylated ligand and the solvent from the mixture; and
drying the organic phosphorescent material in an inert atmosphere.

16. An organic phosphorescent material comprising:
an organic donor-acceptor complex;
a photoactive amino acid; and
an activated carboxylated ligand configured to bind the organic donor-acceptor complex and the photoactive amino acid.

17. The organic phosphorescent material of claim 16, wherein the organic donor-acceptor complex comprises 4-hydroxy butyrate, porphyrin, phthalocyanine, fullerene derivatives, donor-acceptor dyads, porphyrin-fullerene dyads, or combinations thereof.

18. The organic phosphorescent material of claim 16, wherein the photoactive amino acid comprises glutamine, p-benzoylphenylalanine, aspartate (1 and 2), serine, tyrosine, ysteine, nitrophenylglycine (Npg, 6), β-aminoalanine, or combinations thereof.

19. The organic phosphorescent material of claim 16, wherein the activated carboxylated ligand comprises propan-2-ol, 2-chlorobutane, 1-chlorobutane, 3-methylhexane, butanone, 2-methylybutanoic acid, butan-2-ol, 1-chloro-3-methylpentane, or combinations thereof.

20. A kit, comprising:
the organic phosphorescent material of claim 16; and
an illumination source configured to radiate the organic phosphorescent material with visible or ultraviolet light to generate phosphorescence.

* * * * *

UNITED STATES PATENT AND TRADEMARK OFFICE
CERTIFICATE OF CORRECTION

| | | |
|---|---|---|
| PATENT NO. | : 9,708,530 B2 | Page 1 of 1 |
| APPLICATION NO. | : 14/402090 | |
| DATED | : July 18, 2017 | |
| INVENTOR(S) | : Thevasahayam | |

It is certified that error appears in the above-identified patent and that said Letters Patent is hereby corrected as shown below:

On the Title Page

In Item (74), under "Attorney, Agent, or Firm", in Column 2, Line 1, delete "Xinova, LLC" and insert -- Xinova, LLC, Dorsey & Whitney LLP --, therefor.

In the Claims

In Column 11, Line 14, in Claim 9, delete "method comprising:" and insert -- method, comprising: --, therefor.

In Column 12, Line 30, in Claim 18, delete "ysteine," and insert -- cysteine, --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*